Oct. 27, 1959  C. W. HUSUM ET AL  2,910,397
METHOD OF PRODUCING CLOSURE ASSEMBLY
Filed Dec. 13, 1956

INVENTORS
C.W. HUSUM
R.K. FLASKAMP
BY Rule & Hoge
ATTORNEYS

United States Patent Office 2,910,397
Patented Oct. 27, 1959

2,910,397

METHOD OF PRODUCING CLOSURE ASSEMBLY

Charles W. Husum and Richard K. Flaskamp, Toledo, Ohio, assignors to Owens-Illinois Glass Company, a corporation of Ohio Application December 13, 1956, Serial No. 628,015

3 Claims. (Cl. 154—89)

This invention relates to container closures and, more particularly, to an improved container closure assembly including a metal body portion, an internal protective coating, and a gasket. This invention also relates to a method of making such closure assemblies.

Closures for containers often desirably contain a resinous coating on their inner container-contacting surface in order to protect the metal body of the closure from the corrosive effects of the contents. Without such resinous coating, the metal closure, or cap, will frequently deteriorate due to the action of the contents thereon, and also contamination of the container contents will occur. This is particularly disastrous where the contents comprise foodstuffs for human consumption. It is also desirable and of increasing importance for closures to be applied to containers in conjunction with a gasket. The gasket serves to provide a gas-tight seal, thus permitting the maintenance of either vacuum conditions or an inert gas atmosphere within the container. It is additionally most desirable that the closure include the gasket material as an integral component thereof. A closure gasket assembly which includes the gasket as a firmly held integral component eliminates the possibility of the gasket falling out, which problem is otherwise encountered in the utilization of cap gasket assemblies wherein the gasket is loosely held by various types of mechanical clenching arrangements. It may also be noted that where a gasket and a closure are separate, the ultimate seal must depend upon mechanical contact between the cap and the gasket, and thence between the gasket and the finish or uppermost surface of the container to which applied. Obviously, since the gasket seal in the above recited situation must depend upon two physical or mechanical sealing contacts, the chances of ultimate failure of the seal are markedly increased. There have been attempts made to supply closure gasket assembly; however, one of these, as mentioned above, consists in mechanically clenching the gasket in place by encompassing a portion thereof with an inwardly and upwardly directed curl, or bead, provided at the lower margin of the attaching skirt of the metal closure. This, in addition to the referred to disadvantage of allowing an easy gasket fall out, often results in a cutting through of the gasket, particularly where the gasket is of substantially reduced thickness. Furthermore, the seal in this situation must still depend, as recited hereinbefore, upon two physical or mechanical sealing contacts, with the attendant chances of failure. Other attempts to supply a closure gasket assembly require either an auxiliary adhesive to bond the gasket to the closure, or extensive and complicated assembling equipment to unite an unvulcanized or only slightly vulcanized gasket to the closure by means of heat and pressure.

Accordingly, it is an object of this invention to provide a closure and firmly held gasket assembly which contains an integral resinous coating on the inner surface thereof, and which can be readily used by the consumer in automatic container filling and capping operation.

It is a further object of this invention to provide such an assembly in which the gasket material, although previously cured, is efficiently bound to the resinous coating bonded to the inner surface of the closure.

It is yet another object of this invention to provide a simple method of producing such closure gasket assemblies which does not entail the use of adhesives or the use of the relatively complicated equipment ordinarily required in effecting a pressure bond.

These and other objects of this invention will become apparent from the following detailed description, taken in conjunction with the annexed sheet of drawings, on which is presented for purposes of illustration only, several embodiments of this invention.

Basically, this invention is concerned with a closure cap comprising a circular sheet metal top portion, an arrangement for attaching same to a container, an organic coating comprising a proportion of a vinyl composition bonded to the inner surface of said cap, and a cured rubber-like gasket heat bonded to said coating, thereby providing a closure cap bearing a protective resinous coating and an integral rubber-like gasket.

Figures 1, 5:
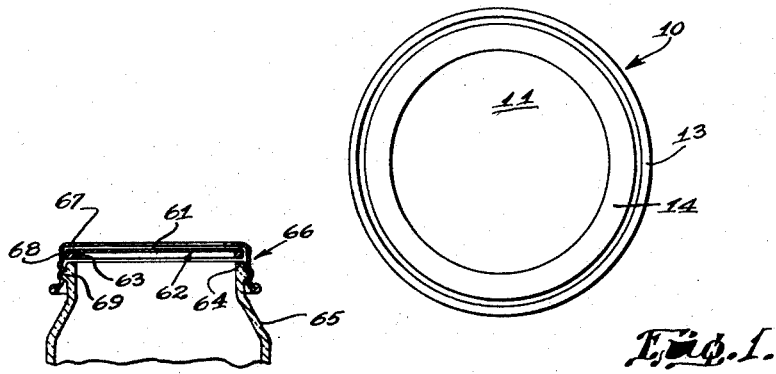
Fig. 1 is a plan view of a closure gasket assembly constituting a specific embodiment of this invention.
Fig. 5 is a vertical section of the upper portion of a glass bottle bearing a closure according to this invention.
Figure 2:
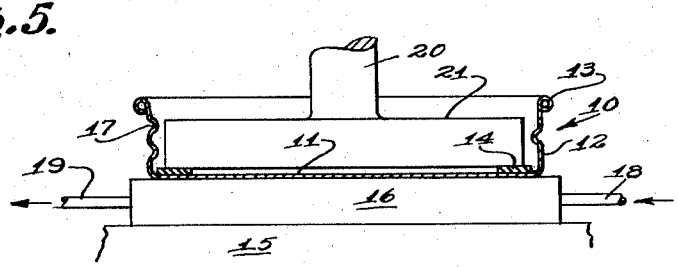
Fig. 2 is a side elevation view of the closure assembly of Fig. 1, supported on a heating platen.

Referring now more specifically to the drawings:

There is shown in Fig. 1 an inverted closure assembly 10, formed of metal sheet and having a circular top portion 11 and a depending annular flange portion 12, terminating in an annular wire portion 13 (Fig. 2). The flange portion 12 and annular wire portion 13 define an attaching arrangement for the closure assembly 10 for engagement with the finish of the container to which the closure will ultimately be affixed. On the inside of the metal body, flush against the circular portion thereof, is positioned a flat annular gasket 14.

In Fig. 2, there is shown a table, or support, 15 upon which is positioned a heating platen 16. The closure assembly is positioned on said heating platen in inverted position so that the circular top portion is flush with the heating surface of the platen, and the annular flange portion, or skirt, projects upwardly. A screw thread 17 is impressed on the inside of the annular flange 12 for the purpose of providing mechanical affixing to the container to which applied. The circular platen 16 is provided with an inlet 18 for the introduction of a heating medium such as steam, hot water, hot oil, etc., and also with an outlet 19 for the exciting of said medium. When the closure has been positioned, as described, on the platen, the gasket 14 is positioned against the circular top portion 11, and contacting pressure is supplied by a shaft 20 to a circular plunger disc 21, having an outside diameter less than the diameter defined by the impressed screw thread 17. The pressure supplied by the aforesaid shaft and plunger is merely for the purpose of positioning the annular gasket 14, and is not sufficient to materially deform the cross-sectional configuration of the gasket. The positioning pressure is supplied while the heating medium is continuously introduced into the platen, and is continued until the gasket 14 bonds to the coating 22 (Fig. 4), previously applied to the closure element.

Figure 3:
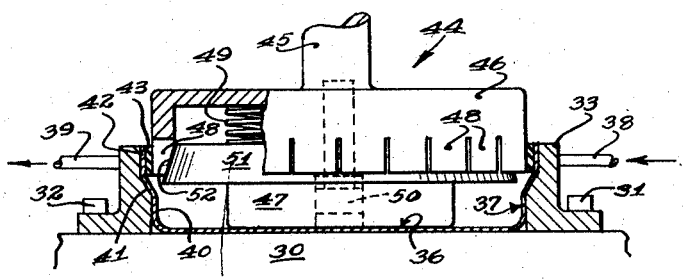
Fig. 3 is a side elevation view, partially broken, of another closure gasket assembly constituting a specific embodiment of this invention, wherein the gasket is positioned on the annular flange portion of the closure body.

In Fig. 3, there is shown another embodiment of this invention, wherein the gasket in annular form is impressed upon and bonded to the anular flange portion (attaching means) of the closure. In this view, a table, or base, 30 has bolted to its upper surface by bolts 31 and 32, a generally circular heating jig 33. The jig 33 contains an interior passageway, not shown, around the peripheral surface contacting the closure, and this passageway is also connected to an outlet 39, by which the heating medium exits, thus making possible continuous introduction and exiting of the heating medium. The annular flange 37 of the closure shown in upstanding position in Fig. 3 contains a vertical peripheral surface 40 projecting upwardly from the margin of the circular top portion 36, and then flares outwardly, defining a peripheral inclined surface 41, and finally extends to another vertical peripheral surface 42. An annular gasket 43, having an outer diameter approximately equal to, but not greater than, the inner diameter defined by the vertical surface 42, is positioned against the inner surface of the vertical surface 42, and maintains that position, as it is prevented from slipping downwardly by the flaring surface 41, which provides a seat for the annular gasket 43. With the gasket 43 positioned as described, a shaft and plunger assembly 44 is directed downwardly into the interior of the closure. The assembly 44 comprises a shaft 45, an expansible cup ring 46, an inner spring 49, an inner cam ring 51, and an adjustable spacer 47. The cup 46, having an outer diameter less than the inner diameter of the annular gasket, contains a plurality of finger members 48 around the periphery thereof. The innermost surfaces 52 of these finger members rest on the periphery of the cam ring 51. This periphery flares outwardly and downwardly, and as the shaft 45 pushes the cup 46 down against the pressure of the inner springs 49, the finger members slide downwardly and outwardly on the outermost surface of the cam ring 51, whereby they are forced out and against the inner diameter of the gasket 43. In such fashion, the vertical downward pressure supplied through the shaft 45 is translated, and the lateral pressure exerted about the periphery of the ring 46 at the finger members 48. The lateral pressure is thus exerted against the gasket 43, and holds it in contact with the vertical inner surface 42 of the closure flange 37. As indicated previously, the pressure supplied is only sufficient to hold the gasket in good contacting relationship with the closure, and is not allowed to be sufficient to materially deform the cross-sectional contour of the gasket. The spacer member 47 is suspended beneath the ring 46 and cam ring 51, and is attached to the shaft 45 by an adjustable screw 50. This enables ready location of the position of the expansible fingers 48 in relation to the gasket 43.

Figure 4:
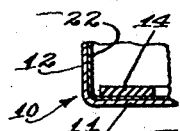
Fig. 4 is an enlarged view of a portion of the closure gasket assembly shown in Fig. 2.

Fig. 4 illustrates in more detail a corner section of the closure assembly 10 of Fig. 1. The circular portion 11 and the annular flange 12 of the closure assembly 10 bear a coating 22 of an organic coating comprising a proportion of a vinyl composition. The annular gasket 14, likewise in flush contact with the coating 22, and by the action of the heat in the absence of material gasket-deforming pressure, is bonded to said coating.

Fig. 5 illustrates an additional structure which the closure cap of this invention may assume. The closure cap consists essentially of a circular sheet metal disc 61, to the inner surface 62 of which is bonded a coating, not shown, of an organic material comprising a vinyl polymer. To this coating is heat bonded an annular gasket 63 formed from a cured rubber-like elastomer. The circular disc is secured to the container 65, pressing the gasket 63 against the top rim 64 of the container by means of an annular member 66 having an annular flange portion 67 contacting the margin of the circular disc and having a depending skirt portion 68 engageable with the threaded finish 69 of the container 65.

*Example 1*

A closure assembly of this invention was prepared according to the method of this invention in the following fashion: a piece of tin plate was coated with a vinyl phenolic copolymer, and the coated plate heated until the coating was cured, e.g., non-tacky to the touch of the finger. The coated plate was fabricated into a closured configuration defining a circular top portion and a depending annular flange. The coated and formed closure was placed on a metal hot plate heated to approximately 154° C. A disc of cured synthetic rubber formed from an acrylonitrile butadiene copolymer was placed inside the shell against the circular top portion in contact with the coating, and sufficient pressure applied to hold the gasket disc in firm contact with the coated closure, but not deforming the contour of the gasket. In five seconds, it was observed that the gasket was firmly bonded to the coating and there was formed an integral closure gasket assembly of this invention.

It is of critical importance in the practice of this invention that the pressure utilized in positioning the gasket not be sufficient to materially alter or deform the rubber-like gasket material. Pressure which does materially alter or deform the gasket tends to effect an increase in the area of contact between the surface of the gasket and the surface of the coating and, consequently, results in a greater area of bonding. Inasmuch as the gasket material possesses inherent elasticity, or the inclination to return to its original undeformed or unaltered status which was coexistent with a smaller area of contacting, the result would be a zone of tension at the point represented by the increase in the area of contact. This zone of tension will reflect itself in a weakening of the bond at that point, and will further propagate itself into adjacent areas of bond, and ultimately effect a weakening and failure of the entire bond. Alternatively, but just as detrimental, it is observed that when gasket deforming pressure is utilized, the release thereof effecting return of the gasket to its original position actually pulls a portion of the coating loose from the metal portion. This, obviously, leaves bare metal exposed to the container contents, resulting in cap deterioration and contamination of container contents.

*Example 2*

Another closure gasket of this invention was prepared as follows: a sheet of tin plate was coated with a vinyl phenolic copolymer resin, as described in connection with Example 1, and heated until the coating was cured and demonstrated non-tackiness. The coated tin plate was then formed into the configuration of a closure having a circular top portion and a depending annular flange. A circular gasket cut from a cured (vulcanized) piece of a filled vinyl chloride polymer was then placed against the circular top portion of the closure. The assembly, in an inverted position, was placed on a metal hotplate and heated to about 160° C., while holding the gasket in firm contact with the coated surface. Within several seconds, it was observed that, even though the coating was heat-hardened to the non-tacky state by baking, the cured or vulcanized gasket had become effectively bonded to the coating, providing a one-piece closure gasket assembly of this invention. The term "cured" or "pre-cured" herein is meant to denote the passage of the liquid coating to the dry, hard, non-tacky state, as accomplished by baking at elevated temperatures, e.g., 300° F. to 400° F.

In general, it has been found that the closures of this invention can be prepared by heat bonding the previously cured gasket materials to the coatings, which include a proportion of a vinyl composition, at temperatures of from about 150° C. to about 200° C. The time required for the gasket to effectively bond to the coating has been found to decrease with increasing temperature.

In accordance with this invention, it is found that dielectric heating may be conveniently utilized, inasmuch as the temperature and not the pressure is the controlling factor in establishing the bond between the gasket material and the coating. This type of heating and bonding, of course, readily provides a time-saving means in manufacturing gasket closure assemblies.

In general, within the purview of this invention, the resinous material to be utilized as the coating on the inner surface of the closure may be any organic resinous material which includes a proportion of a vinyl composition. The vinyl composition may be a vinyl halide, of which vinyl chloride is an example; a vinyl ester, such as vinyl acetate; a vinylidene; or any combination of the foregoing, including copolymers thereof, with other organic resinous materials. Preferably, the coating should effectively insulate the metal portion of the closure from the contents and preclude cap deterioration and contamination of container contents.

The gasket materials for use in providing a closure of this invention are the cured elastomeric compositions capable of bonding to the coating at elevated temperatures without the application of gasket-deforming pressure. Polymers represented by the polymerization of butadiene and acrylonitrile, and the vinyl halide polymers have been found to be of particular utility in this regard. It has also been found that the above materials may be compounded with other elastomers, for instance, natural rubber. A variety of fillers, curing agents, accelerators, plasticizers, retarders, lubricants, waxes, softeners, etc., may be included in formulating or compounding the gasket material. Thus, carbon black, various metal oxides, e.g., zinc oxide, magnesium oxide, and various commercially available clay filler materials have been found to be readily incorporated into the formulation of the gasket material. Examples of curing agents and accelerators which have been utilized are the conventional sulphur of commerce, and tetramethyl thiuram monosulphide.

While there have been disclosed in considerable detail certain preferred manners of performing this invention, it is not intended or desired to be solely limited thereto, for, as stated hereinbefore, the procedure may be modified, the precise proportions of materials utilized may be varied, and other materials having equivalent properties may be employed as desired, without departing from the spirit and scope of the invention as defined in the appended claims.

We claim:

1. In a method of making a gasketed metal closure cap suitable for maintaining vacuum conditions within a container to which applied, the closure cap having bonded to an inner surface thereof a layer of a protective organic coating including a heat-hardened polymeric vinyl constituent, the improvement of directly superimposing on said coating a cured and formed annular gasket of an elastomeric composition, applying pressure to said coating and said gasket to urge the gasket into intimate bonding contact with the organic coating, said pressure being insufficient to materially distort the gasket, and heating said gasket and coating to bond the gasket to the coating.

2. In a method of making a gasketed metal closure cap suitable for maintaining vacuum conditions within a container to which applied, the closure cap having bonded to an inner surface thereof a coating of a vinyl phenolic copolymer, the improvement of directly superimposing on said coating a cured and formed annular gasket of an elastomeric acrylonitrile butadiene copolymer, applying pressure to said coating and said gasket to urge the gasket into intimate bonding contact with the organic coating, said pressure being insufficient to materially distort the gasket, and heating said gasket and coating to a temperature not in excess of 200° C. to bond the gasket to the coating.

3. In a method of making a gasketed metal closure cap suitable for maintaining vacuum conditions within a container to which applied, the closure cap having bonded to an inner surface thereof a coating of a vinyl phenolic copolymer, the improvement of directly superimposing on said coating a cured and formed annular gasket of a filled vinyl chloride polymer, applying pressure to said coating and said gasket to urge the gasket into intimate bonding contact with the organic coating, said pressure being insufficient to materially distort the gasket, and heating said gasket and coating to a temperature not in excess of 200° C. to bond the gasket to the coating.

References Cited in the file of this patent

UNITED STATES PATENTS

| | | |
|---|---|---|
| 2,238,681 | Dorough | Apr. 15, 1941 |
| 2,380,456 | Maier et al. | July 31, 1945 |
| 2,514,196 | Bradley | July 4, 1946 |
| 2,516,647 | Rogers et al. | July 25, 1950 |
| 2,581,920 | Kuhn | Jan. 8, 1952 |
| 2,663,909 | Maier et al. | Dec. 29, 1953 |
| 2,719,564 | Schneider | Oct. 4, 1955 |
| 2,731,071 | Husum | Jan. 17, 1956 |
| 2,823,422 | Schneider | Feb. 18, 1958 |